March 17, 1931.      T. E. HALLDORSON      1,796,456
LENS SHADE
Filed March 9, 1928

INVENTOR:
Thomas E. Halldorson
By E. J. Andrews
Atty.

Patented Mar. 17, 1931

1,796,456

UNITED STATES PATENT OFFICE

THOMAS E. HALLDORSON, OF CHICAGO, ILLINOIS

LENS SHADE

Application filed March 9, 1928. Serial No. 260,531.

This invention relates to lens shades to be used with photographic or other apparatus employing lenses for concentrating light, and for similar purposes; and it has for its object providing an improved shade for the lens so as to prevent light passing to the lens from objects outside the field to be photographed. One of the particular objects of the invention is to provide shade means which may be used to vary uniformly and continuously the field from which the light is passing to the lens so as to eliminate the stray outside light without affecting the field to be photographed, as that field may be varied. Other objects of the invention will be apparent from a consideration of the accompanying drawings and the following description thereof.

Figure 1:
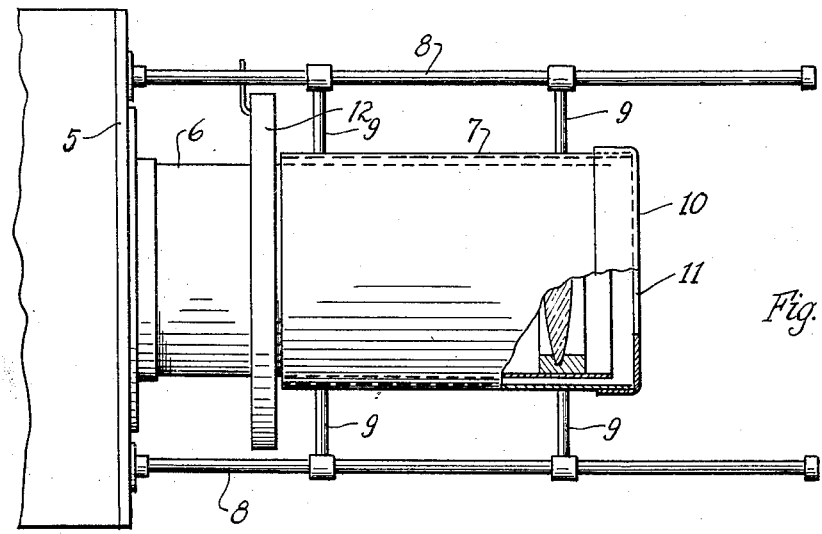
Figure 2:
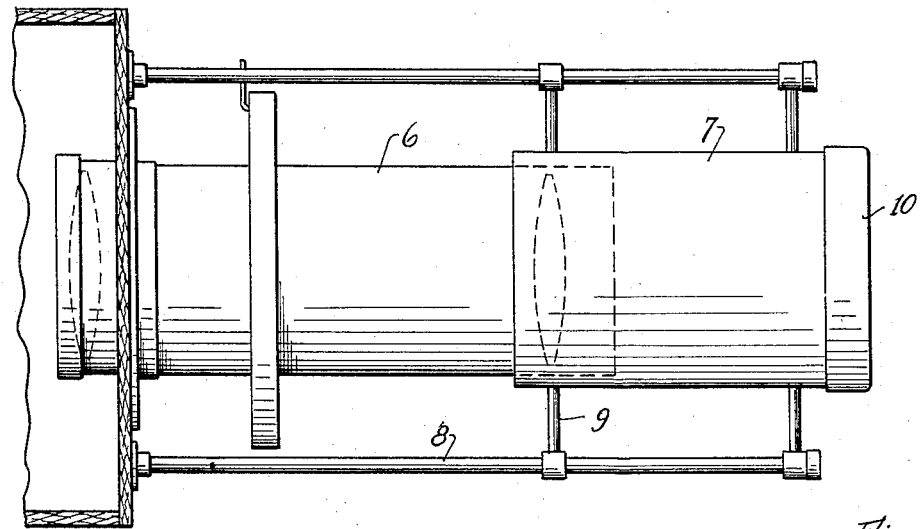
Figure 3:
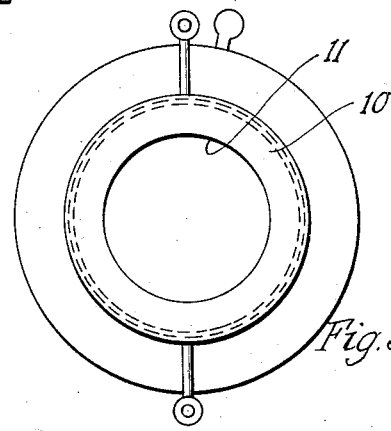

Of the drawings, Fig. 1 is a side elevation of lens supporting means and shading means which embody the features of my invention; Fig. 2 is a similar view of the apparatus with the shading means adjusted to reduce the amount of light compared with the arrangement of Fig. 1; and Fig. 3 is an end or front elevation of the apparatus.

The shade is applicable to any uses of lenses or similar apparatus but, to illustrate my invention, I show it applied herein to a photographic camera. In front of the camera, as is common, is mounted a board 5 for supporting the lens cylinder 6 and within this cylinder is mounted, in any suitable manner the lenses of the camera. Any ordinary shutter may be used, such as the shutter 12. Slidably mounted on the camera, and encircling the cylinder 6, is a lens shade 7. This shade is preferably in the form of a cylinder and it is somewhat larger than the lens cylinder 6. The shade is slidably mounted in any suitable manner. I prefer, for this purpose, to provide rods 8, which are fixed to the lens board 5, and, by means of the cross rods 9, fixed to the lens shade 7 and slidably mounted on the rods 8, the shade can be shifted longitudinally with reference to the lens cylinder as much as may be necessary.

Obviously, as the lens shade is shifted outwardly from the camera from the position indicated in Fig. 1, less and less light will be able to pass from surrounding objects into the open end of the cylinder 6 and, thus, through the lenses to the photographic plate. When the shade is in the position indicated in Fig. 2, the amount of light that passes from objects outside the object being photographed will be relatively much reduced. Thus, as will be understood, the size of the field to be photographed may be gradually varied and, at the same time, by merely shifting the shade, the light from outside objects can be eliminated without affecting the light from the field.

To assist in eliminating outside light as the size of the field to be photographed is varied, a cap 10 may be used. This cap is arranged to slip over the end of the shade 7 and it has an opening 11 which is materially less than the opening of the end of the shade. By placing this cap on the front end of the shade, the amount of light passing from outside objects is much reduced and can be reduced still more or entirely eliminated by sliding the shade forwardly so far as may be desired.

It will be understood also that various caps may be used with the openings 11 varying as much as may be desired. While caps of this nature have been used on lens cylinders, yet, by applying them to my slidable shade, the effect of the shade in eliminating undesirable light may be continuously varied by varying the opening in the cap applied to the shade and shifting the shade to the most effective position for the particular field and cap. By the use of my shade the various openings 11 may be so related that the maximum amount of undesirable light which can be eliminated by a cap with a large opening will be fully as much as the minimum amount by a cap with a smaller opening; so that there need be no steps in the graduation of the amount of light eliminated from the minimum to the maximum.

I claim as my invention:

1. A lens shade comprising a cylinder slidably mounted on and encircling a lens holder, and a detachable cap mounted on the outer end of said cylinder, said cap having an opening in its front wall.

2. In a camera a lens cylinder, a lens mounted in said cylinder, a shade cylinder enclosing and coaxial with said lens cylinder, means for supporting said shade cylinder, said shade cylinder being slidably mounted on said supporting means, and a perforated cap detachably mounted on the outer end of said shade cylinder.

In testimony whereof, I hereunto set my hand.

THOMAS E. HALLDORSON.